US009516153B2

(12) United States Patent
Tichauer

(10) Patent No.: US 9,516,153 B2
(45) Date of Patent: Dec. 6, 2016

(54) METHOD AND SYSTEM FOR TELECOMMUNICATION SESSION OUTPUT INTEGRATION

(71) Applicant: Vonage Business Inc., Atlanta, GA (US)

(72) Inventor: Royee Uriel Tichauer, Haifa (IL)

(73) Assignee: Vonage Business Inc., Atlanta, GA (US)

( * ) Notice: Subject to any disclaimer, the term of this patent is extended or adjusted under 35 U.S.C. 154(b) by 191 days.

(21) Appl. No.: 14/312,805

(22) Filed: Jun. 24, 2014

(65) Prior Publication Data

US 2015/0373182 A1 Dec. 24, 2015

(51) Int. Cl.
| | |
|---|---|
| *H04M 1/725* | (2006.01) |
| *H04W 4/00* | (2009.01) |
| *H04M 3/42* | (2006.01) |
| *H04W 4/18* | (2009.01) |
| *H04M 1/656* | (2006.01) |
| *H04M 1/658* | (2006.01) |

(52) U.S. Cl.
CPC ......... *H04M 1/72552* (2013.01); *H04M 1/656* (2013.01); *H04M 1/658* (2013.01); *H04M 3/42221* (2013.01); *H04W 4/003* (2013.01); *H04W 4/18* (2013.01)

(58) Field of Classification Search
CPC ....... H04W 4/18; H04W 4/003; H04W 4/00; H04M 1/72552; H04M 3/42221; H04M 1/7255; H04M 1/658; H04M 1/656
See application file for complete search history.

(56) References Cited

U.S. PATENT DOCUMENTS 8,571,528 B1 * 10/2013 Channakeshava ... H04M 3/42221
379/201.01

2006/0258388 A1 11/2006 Sato
2010/0042647 A1 * 2/2010 Schultz ............... H04L 12/1831
379/85
2010/0173618 A1 * 7/2010 Kass ................. H04M 3/42221
455/414.1
2012/0232978 A1 * 9/2012 Steul ..................... H04W 4/206
705/14.25
2012/0315880 A1 * 12/2012 Peitrow ................ H04M 1/642
455/412.1
2014/0187214 A1 * 7/2014 Travis ............... H04M 3/42221
455/414.1

FOREIGN PATENT DOCUMENTS

| KR | 20030018729 A | 3/2003 |
| KR | 20110041322 A | 4/2011 |
| WO | WO2013002478 A1 | 1/2013 |
| WO | WO2013062237 A1 | 5/2013 |

OTHER PUBLICATIONS

European Search Report for Application No. PCT/US2015/036888, dated Sep. 30, 2015, 13 pages.
"Call Reminder—Andriod Apps on Google Play." Downloaded Jan. 2, 2015. https://play.google.com/store/apps/details?id=com.duckbone.callreminder.

* cited by examiner

*Primary Examiner* — Ajit Patel
(74) *Attorney, Agent, or Firm* — Moser Taboada; Joseph Pagnotta

(57) ABSTRACT

A method and system for integrating telecommunication session output with one or more applications are provided herein. The method for integrating telecommunication session output with one or more applications includes communicating with one or more second devices in a telecommunication session using a first application disposed on a first device; tracking attributes associated with the telecommunication session; recording at least a portion of the telecommunication session on the first device to produce a session recording; and storing the attributes and at least one of the session recording, or a text transcription of the session recording in a second application on the first device.

23 Claims, 4 Drawing Sheets

METHOD AND SYSTEM FOR TELECOMMUNICATION SESSION OUTPUT INTEGRATION

BACKGROUND

Field

Embodiments of the present invention generally relate to methods and systems for telecommunication session output integration, and more particularly, to a method and system for creating post-call reminders.

Description of the Related Art

Often, after a telecommunication session, a mobile phone user needs to record information discussed during the telecommunication session, or schedule tasks in response to the discussion. For example, the user may set a reminder to call a person, or record a note to ask said person about a given topic. Each of these tasks requires manual entry on the part of the user. Manual entry of tasks is time consuming and inefficient. In addition, manually noting what was discussed during a session may be inaccurate and incomplete.

Therefore, there exists a need in the art for a method and system for integrating telecommunication session output with one or more applications.

SUMMARY

A method and system for integrating telecommunication session output with one or more applications are provided herein. In some embodiments, a method for integrating telecommunication session output with one or more applications may include communicating with one or more second devices in a telecommunication session using a first application disposed on a first device; tracking attributes associated with the telecommunication session; recording at least a portion of the telecommunication session on the first device to produce a session recording; and storing the attributes and at least one of the session recording, or a text transcription of the session recording in a second application on the first device.

In some embodiments, a method for integrating telecommunication session output with one or more applications may include communicating with one or more second devices in a telecommunication session using a first application disposed on a first device, tracking attributes associated with the telecommunication session, receiving an input indicating a task associated with the telecommunication session to send to one or more second devices, generating a message comprising the task and at least some of the tracked attributes, and transmitting the message to the one or more second devices.

In some embodiments, a system for integrating telecommunication session output with one or more applications, may include a mobile application configured to: communicate with one or more second devices in a telecommunication session using a first application disposed on a first device; track attributes associated with the telecommunication session; record at least a portion of the telecommunication session on the first device to produce a session recording; and store the attributes and at least one of session recording, or a text transcription of the session recording in a second application on the first device.

In some embodiments, a computer readable medium for integrating telecommunication session output with one or more applications is disclosed. The computer readable medium comprises instructions that when executed by at least one processor causes the at least one processor to perform the method for integrating telecommunication session output with one or more applications.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
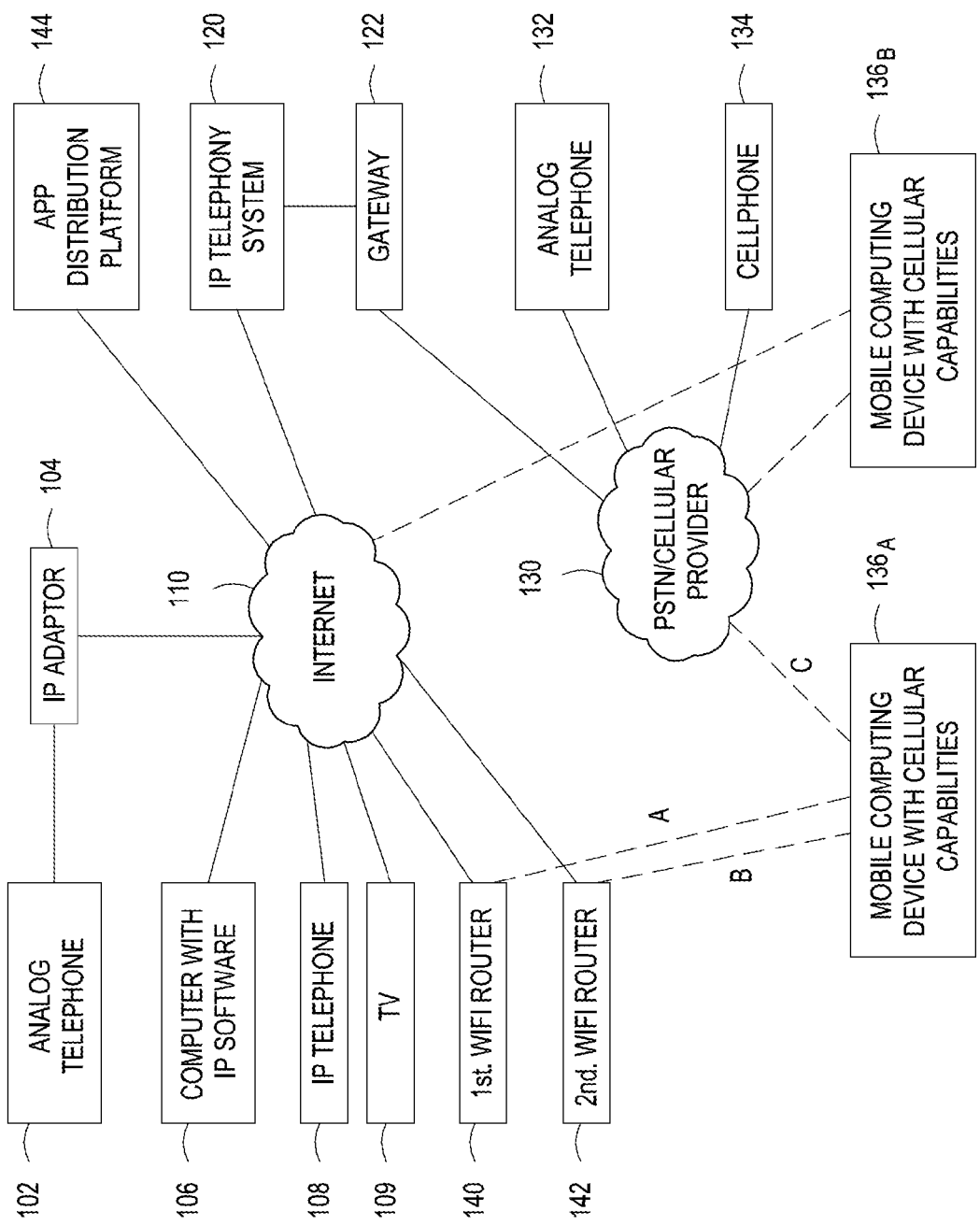
FIG. 1 depicts a block diagram of a telecommunication network, according to one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a method and system for integrating telecommunication session output with one or more applications (also referred to as apps herein). More specifically, embodiments of the present invention enable recording of a telecommunication session. The telecommunication session may be recorded in part or in its entirety. In some embodiments, permission from all participants of the telecommunication session is received prior to recording the telecommunication session communications. After the telecommunication session has ended, either the recording itself or a text version/transcript of the recording is stored on a user's device in an application of the user's choosing, for example, a calendar app, a notes app, or the like. In some embodiments, permission from the participants is requested and verified prior to storing/using the recording or transcript of the recording. In addition, the user is prompted to store other tasks or reminders. For example, the user may store a reminder to ask a specific person a question next time the user and the person speak. The reminder may be stored in a notes app and linked to the person's contact information such that when the person calls, the reminder is displayed to the user. Other tasks may include storing a location in a map app, storing a time in the calendar app when to place a call, and the like. Further, a task may be sent to a participant in the telecommunication session and placed in an application on the participant's mobile device. For example, a first participant on a first device may send a task to a second participant's device to place a reminder on the second participant's calendar app reminding the second participant to call the first participant at a later specified time. Thus, embodiments of the present invention advantageously provide a user in a telecommunication session an ability to store reminders and tasks in one or more applications on the user's device or a participant's device.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Some exemplary embodiments described below are with respect to a mobile Voice over Internet Protocol (VOIP) telecommunication app. However, one skilled in the art will readily recognize from the following description that any native application may be used in embodiments consistent with the present invention without departing from the principles of the disclosure described herein.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected to one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software, sometimes referred to as an "over-the-top" (or "OTT") telecommunication application, as it provides a service over the wireless data connection.

FIG. 1 illustrates that a mobile computing device with cellular capabilities $136_A$ (e.g., a smartphone) is capable of establishing a first wireless data connection A with a first wireless access point 140, such as a WiFi or WiMax router. The first wireless access point 140 is coupled to the Internet 110. Thus, the mobile computing device $136_A$ can establish a VOIP telephone call with the IP telephony system 120 via a path through the Internet 110 and the first wireless access point 140.

FIG. 1 also illustrates that the mobile computing device $136_A$ can establish a second wireless data connection B with a second wireless access point 142 that is also coupled to the Internet 110. Further, the mobile computing device $136_A$ can establish either a third wireless data connection C via a packet-switch network provided by a cellular service provider 130 using its cellular telephone capabilities, or establish a voice based session telephone call via a circuit-switched network provided by a cellular service provider 130. The mobile computing device $136_A$ could also establish a VoIP telephone call with the IP telephony system 120 via the second wireless connection B or the third wireless connection C.

Although not illustrated in FIG. 1, the mobile computing device $136_A$ may be capable of establishing a wireless data connection to a data network, such as the Internet 110, via alternate means. For example, the mobile computing device $136_A$ might link to some other type of wireless interface using an alternate communication protocol, such as the WIMAX standard.

Similarly, mobile computing device with cellular capabilities $136_B$ may also be coupled to internet 110 and/or cellular service provider 130. In some embodiments, mobile computing device $136_B$ may be connected to internet 110 via a WIFI or WIMAX connection, and the like, and can also establish a VOIP telephone calls with the IP telephony system 120 similar to mobile computing device $136_A$. In embodiments of the present invention, communications environment 100 may be used to establish voice based or data based telecommunications sessions between mobile computing device $136_A$ and mobile computing device $136_B$, depending on various criteria associated with each of the mobile computing devices, as will be described below in more detail.

In the embodiments described above, a device may act as a mobile telephony device once it is configured with appropriate application software that may be downloaded from an app distribution platform 144. For example, mobile computing device $136_A$ may download a VOIP mobile app from app distribution platform 144 and install the VOIP mobile app locally making the app a native application running on mobile computing device $136_A$.

Figure 2:
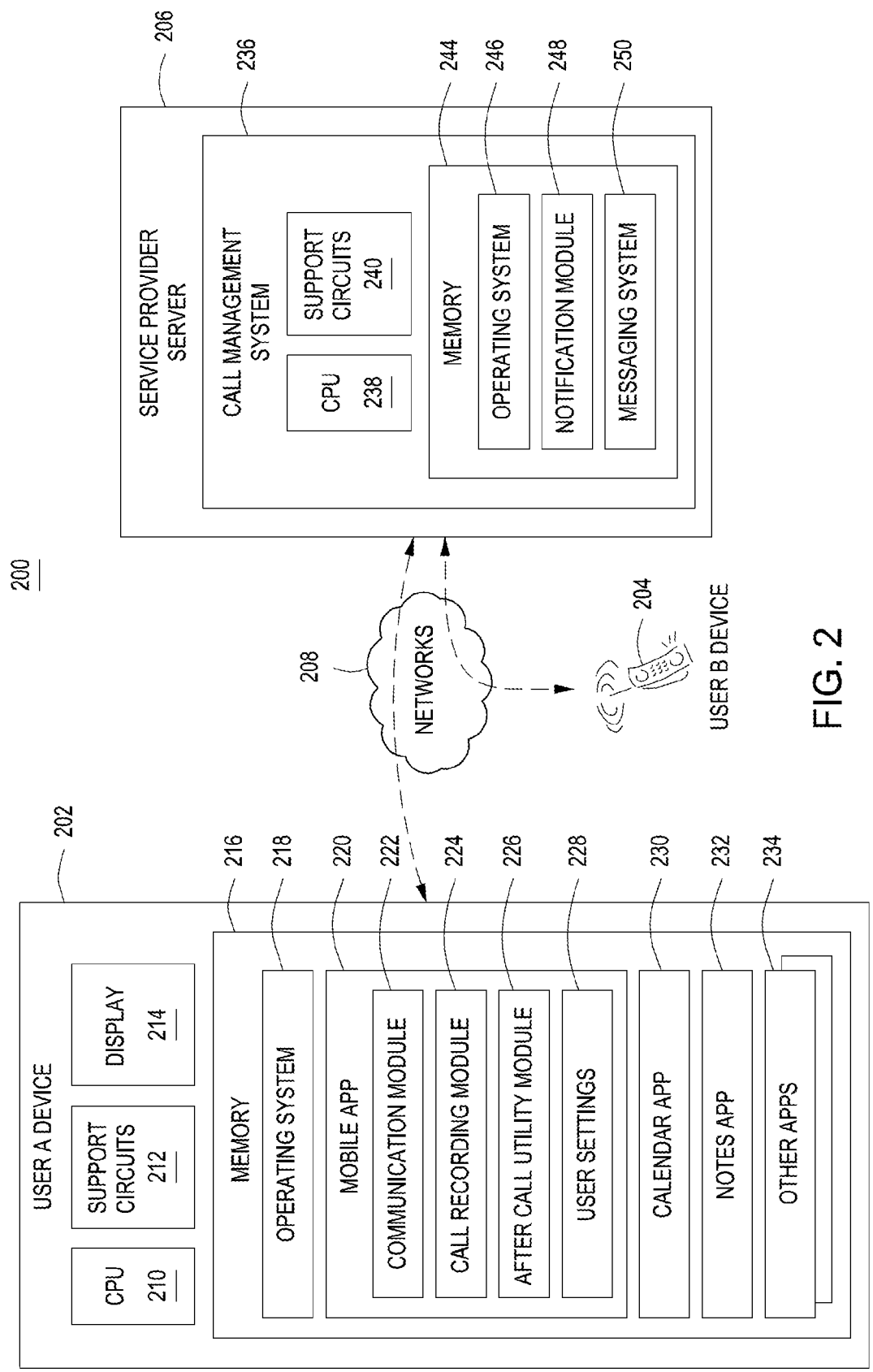
FIG. 2 depicts a block diagram of a system for integrating telecommunication session output with one or more applications, according to one or more embodiments.

FIG. 2 depicts a block diagram of a system 200 for integrating telecommunication session output with one or more applications, according to one or more embodiments. The system 200 includes at least one telecommunication service provider server 206 that can provide telecommunication services to a plurality of end-user devices (e.g., such as User A device 202 and User B device 204) via one or more networks 208. Devices 202 and 204 may include a computer with IP software 106, IP telephone 108, and/or mobile computing device with cellular capabilities 136A, 136B, and the like, as shown in FIG. 1. The telecommunication service provider server 206 may include IP telephone system 120 or PSTN/cellular provider 130.

Each user device (e.g., User A device 202 and User B device 204) comprises a Central Processing Unit (CPU) 210, support circuits 212, display 214, and a memory 216. The CPU 210 may comprise one or more commercially available microprocessors or microcontrollers that facilitate data processing and storage. The various support circuits 212 facilitate the operation of the CPU 210 and include one or more clock circuits, power supplies, cache, input/output circuits, and the like. The memory 216 comprises at least one of Read Only Memory (ROM), Random Access Memory (RAM), disk drive storage, optical storage, removable storage and/or the like. In some embodiments, the memory 216 comprises an operating system 218, a mobile application 220, a calendar app 230, a notes app 232, and one or more other apps 234. The mobile application 207 may include a communication module 222, a call recording module 224, an after call utility module 226, and user settings 228. In some embodiments, the mobile application 220 may be an OTT telecommunication application as described above.

The operating system (OS) 218 generally manages various computer resources (e.g., network resources, file processors, and/or the like). The operating system 218 is configured to execute operations on one or more hardware and/or software modules, such as Network Interface Cards (NICs), hard disks, virtualization layers, firewalls and/or the like. Examples of the operating system 218 may include, but are not limited to, LINUX, MAC OSX, BSD, UNIX, MICROSOFT WINDOWS, 10S, ANDROID and the like.

The telecommunication service provider server 206 may include a call management system 236. The call management system 236 may include a Central Processing Unit (CPU) 238, support circuits 240, and a memory 244. The CPU 238 may comprise one or more commercially available microprocessors or microcontrollers that facilitate data processing and storage. The various support circuits 240 facilitate the operation of the CPU 238 and include one or more clock circuits, power supplies, cache, input/output circuits, and the like. The memory 244 comprises at least one of Read Only Memory (ROM), Random Access Memory (RAM), disk drive storage, optical storage, removable storage and/or the like. The memory 244 includes an operating system 246, a notification module 248, and a messaging system 250. The messaging system 250 may be any system that facilitates the sending and receiving of SMS and MMS message, OTT messaging app messages, and the like.

The operating system 246 generally manages various computer resources (e.g., network resources, file processors, and/or the like). The operating system 246 is configured to execute operations on one or more hardware and/or software modules, such as Network Interface Cards (NICs), hard disks, virtualization layers, firewalls and/or the like. Examples of the operating system 246 may include, but are not limited to, LINUX, MAC OSX, BSD, UNIX, MICROSOFT WINDOWS, IOS, ANDROID and the like.

The networks 208 comprise one or more communication systems that connect computers by wire, cable, fiber optic and/or wireless link facilitated by various types of well-known network elements, such as hubs, switches, routers, and the like. The networks 208 may include an Internet Protocol (IP) network 110, a public switched telephone network (PSTN) 130, or other mobile communication networks, and may employ various well-known protocols to communicate information amongst the network resources.

In operation, user A device 202 may initiate a call to user B device 204. Call management system 236 of service provider server 206 establishes the call between user A device 202 and user B device 204. In some embodiments, the service provider server 206 may be a VoIP service provider server and the call between user A device 202 and user B device may be a VoIP call over a VoIP network. In a VoIP network, the call request oftentimes takes the form of a Session Initiation Protocol (SIP) INVITE message sent from user A device 202 to a call management system 236. In a VoIP network, the call management system 236 may be, for example, part of a SIP Proxy Network. The details and functionality of SIP can be found in the Internet Engineering Task Force (IETF) Request for Comments (RFC) Paper No. 3261 entitled, "SIP: Session Initiation Protocol" herein incorporated in its entirety by reference. Although the present disclosure describes embodiments involving calls between two participants, the call may include two or more participants. In some embodiments, the call recording module 224 on user A device 202 and user B device 204 displays a prompt requesting permission to record the call. In some embodiments, the responses to the prompt are sent via the messaging system 250 to user A device 202. In other embodiments, the responses may be sent via User Datagram Protocol (UDP) datagrams or Transmission Control Protocol (TCP) data packets. The call recording module 224 of user A device 202 determines whether all participants have granted permission based on the responses received. In some embodiments, the call recording module 224 may generate a notification message (e.g., via an SMS message, UDP datagram, etc.) indicating the recording status of the telecommunication session, for example, "Call may be recorded" or "Call is not being recorded". The communication module 222 transmits the message to the service provider server 206, where the notification module 248 forwards the message to each participant's user device. The call recording module 224 displays the message on display 214. Based on user setting 228, call information may be tracked during the call. Call information includes attributes of the call, for example, participants on the call, call duration, call quality, and the like. While the call is in progress, if recording is enabled, the user of user A device 202 may select to start and/or stop recording at any time during the call in order to record parts of the call or to record the call in its entirety. The call recording module 224 records the selected conversations during the call. In some embodiments, when the call is ended, the call recording module 224 may once again prompt each participant to verify permission to store the recording of the call. If all participants grant permission, the after-call utility module 226 prompts the user to identify in what application the user would like to store the recording of the call. In other embodiments, permission from all participants may not be required and the after-call utility module 226 prompts the user to identify in what application the user would like to store the recording of the call as soon as the call has ended. For example, the user may select the calendar app 230 so the user may refer back to the date of the call on the calendar app 230 and listen to the recorded portions of the call. Alternatively, the user may select to convert the audio to text. The user may select to store the text of the conversation on the calendar app 230, the notes app 232, or another app 234 on the user A device 202.

The after call utility module 226 then displays a prompt on the user A device 202 providing options of other after-call tasks or reminders. For example, the user may select an option to store the tracked call information on the calendar. The information may be linked to contact information of the participants on the call, such that when a participant calls user A device 202, the call information may be displayed, thereby reminding the user of user A device 202 of their last call. Alternatively, the user may select an option to store a reminder to the calendar app 230 to call a participant at a later date. The user may store any desired information about the call on any available app on the user A device 202.

The after-call utility module 226 may also prompt the user to set a task in an application on a participant's device, for example, on the calendar app 230 of user B device 204. For example, the user may select an option to place a reminder on the calendar app 230 of user B device 204 to call the user at a specific date and time. The task is transmitted from the user A device 202 to the service provider server 206, specifying the task to be stored and an app on user B device 204 in which to store the task. The notification module 248 identifies one or more participants who are to receive the task and transmits the task to the user device of the one or more identified participants, for example user B device 204. The mobile app 220 of user B device 204 parses the task received from the notification module 248 and stores the task in the specified app.

Figure 3:
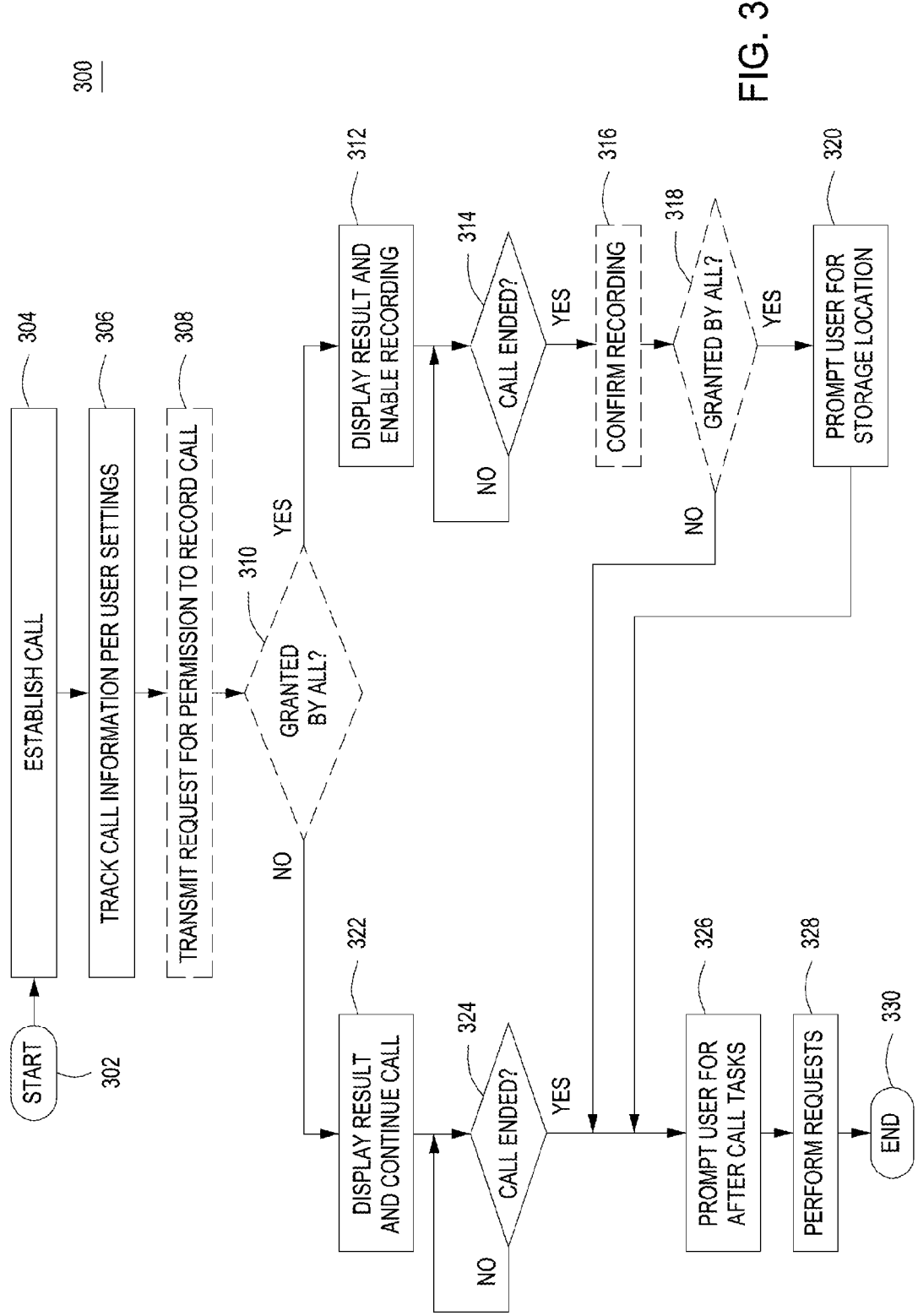
FIG. 3 depicts a flow diagram of a method for integrating telecommunication session output with one or more applications, according to one or more embodiments of the invention.

FIG. 3 depicts a flow diagram of a method 300 for integrating telecommunication session output with one or more applications, according to one or more embodiments of the invention. The method 300 begins at step 302 and proceeds to step 304.

At step 304, a communication session, for example, an audio call is established between a user who initiates the call and one or more participants. The user initiates the call from a mobile device that includes a mobile app, such as a mobile Voice over Internet Protocol (VOIP) telecommunication app.

At step 306, information regarding the call is tracked based on user settings. User settings within the mobile app may include participant identities, call duration, call quality and the like. The information specified by the user settings is tracked for the duration of the call.

At step 308, optionally, a request for permission to record the call is sent from the device of the user who initiated the call to each of the one or more participants. The request is sent to a service provider server of the provider of the mobile app. The request is forward to each of the one or more participants.

At step 310, it is optionally determined whether all participants on the call have granted permission to record the call. In some embodiments, the call recording module 224 on the user device 202 determines whether each participant on the call granted permission to record the call. If permission is not granted by all participants, the method 300 proceeds to step 322.

At step 322, a message is displayed on the user device indicating that the call is not being recorded. The message is also sent via the service provider server to the other participants on the call to inform the other participants that the call is not being recorded. The call continues without being recorded. At step 324, it is determined whether the call has ended. If the call has not ended, the call continues as the method 300 waits until the call has ended at which time, the method 300 proceeds to step 326.

However, if at step 310, it is determined that all participants on the call have granted permission to record the call, the method 300 proceeds to step 312. At step 312, a message is displayed on the user device indicating that recording of the call is enabled. The message is also sent via the service provider server to the other participants on the call to inform the other participants that recording of the call is enabled. In some embodiments, the call is automatically recorded in its entirety. In some embodiments, the recording may be started and stopped, such that excerpts of the call are recorded, rather than the entire call.

At step 314, it is determined whether the call has ended. If the call has not ended, the call continues as the method 300 waits until the call has ended, at which time, the method 300 proceeds to step 316.

At step 316, optionally, a request to verify permission to store the call is sent from the device of the user who initiated the call to each of the one or more participants. The request is sent in order to give participant an opportunity to stop storage of the recording based on what was discussed on the call. The request is sent to a service provider server of the provider of the mobile app. The request is forward to each of the one or more participants.

At step 318, it is optionally determined whether all participants on the call have verified permission to store the call. If permission is verified by all participants, the method 300 proceeds to step 320. At step 320, a user is prompted to select a storage location for the recording. The user is prompted to select an application from the plurality of applications on the user's device in which to store the recording. In some embodiments, the user may select to store an audio recording of the call or store a text version of the recording. For example, the user may select an option to convert the audio to text and store it in a calendar app on the date of the call. The user may select an option to store the text in a notes app of the user's device. The user may store the recording in one or more applications on the user's device. The method 300 proceeds to step 326.

However if at step 318, permission is not verified by all participants at the end of the call, the method 300 skips storage of the recording and proceeds to step 326.

At step 326, the method 300 prompts the user to select one or more post-call tasks to be performed. For example, the user may select an option to store the information tracked per user settings in a calendar app to maintain a record of the call. In some embodiments, the user may select an option to link the tracked information in the calendar app to contact information for the participants on the call. The user may select an option to enter a note regarding the call and have the note linked to the tracked information in the calendar app and/or linked to a contact associated with the entered note. The user may select an option to store a location in, for example, a map app to in order to identify a location discussed during the call. Any information may be stored in any application on the user device and linked to the call information and/or contact information.

In addition, the user may select an option to place any information regarding the call to be placed in an application on one or more participants' devices. The user may select an option to place a task in an application on the device of one or more participants. For example, the user may choose to place a task in a participant's calendar application reminding the participant to call the user back at a specific date and time.

At step 328, the one or more options selected by the user are performed. Information, tasks, and reminders are stored in the one or more applications selected by the user. Application Program Interfaces (APIs) are used to interface with the one or more applications selected by the user. For example, on an ANDROID device, apps may subscribe to ANDROID events. In order for the mobile app to make a change in a calendar app, the mobile app subscribes to events regarding changes in calendar events. When the user selects to place information, tasks, or reminders in the calendar app, the mobile app triggers an ANDROID OS event of type calendar, and all of the apps listening to events of type calendar act according to the event prompted. The user may be provided an option to select which calendar app to use to complete the task. On an iOS, the operating system provides a list of calendars. Each calendar object implements APIs that outside apps may use to add/edit/remove events from a selected calendar.

In the event the user selects to place a task in an application of a participant, a message is sent to the identified participant. For example, the message format may be Extensible Markup Language (XML) where each tag represents either a text value or a name of a file (e.g., a call recording). A mobile app on the participant device stores the identified task in the specified app using APIs as described above. Files that are created by a user, for example, a call recording, are uploaded to a service provider server. The app on the participant's device interprets the text values and/or sends a request to the server for the file. After the app on the participant's device receives the file from the service provider server, the app stores the data in the participant's device. The messages are sent between the user devices and the service provider server using a TCP/IP protocol. The method 300 proceeds to step 330 and ends.

Figure 4:
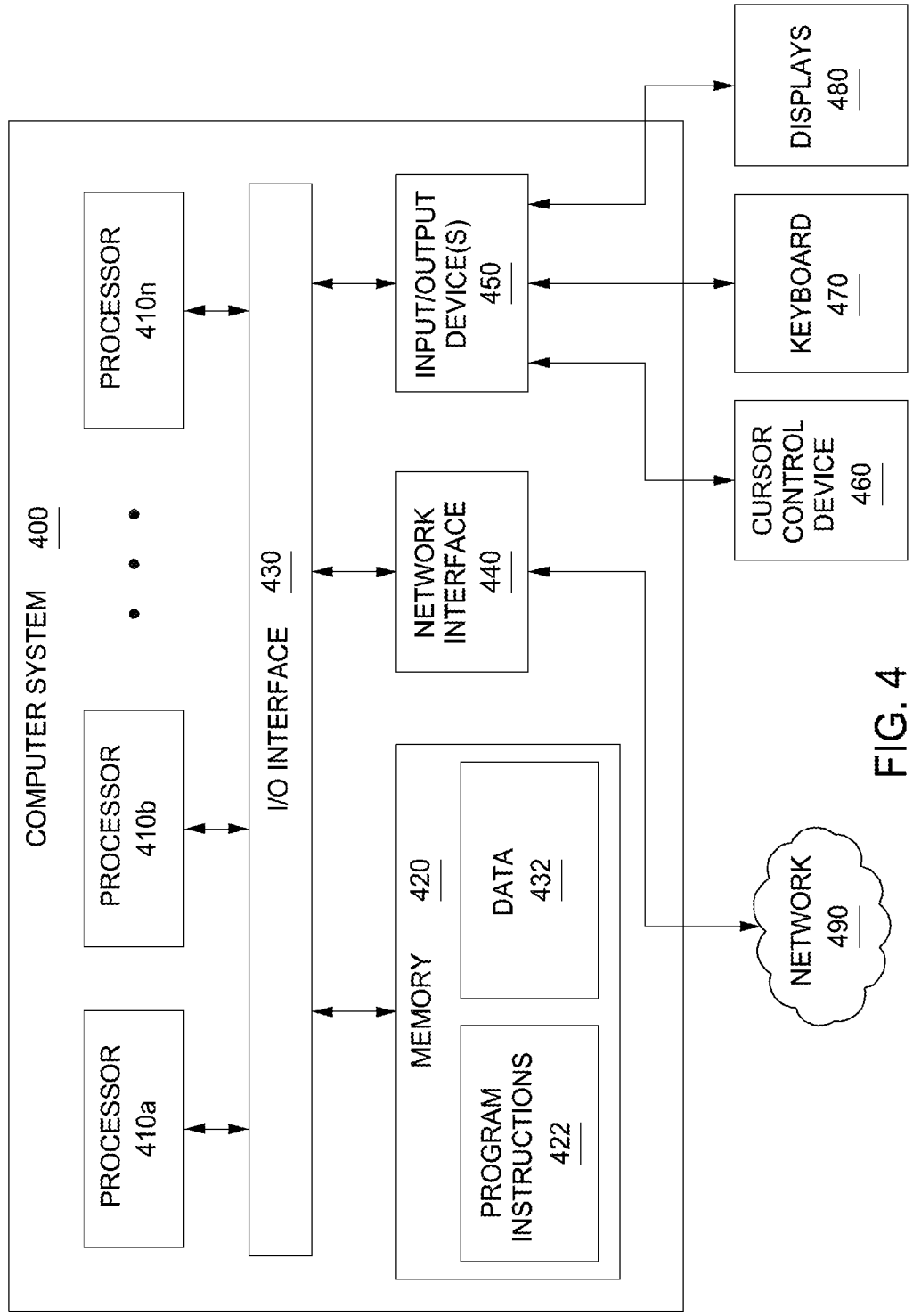
FIG. 4 depicts a computer system that can be utilized in various embodiments of the present invention to implement the computer and/or the display, according to one or more embodiments.

FIG. 4 depicts a computer system 400 that can be utilized in various embodiments of the present invention to implement the computer and/or the display, according to one or more embodiments.

Various embodiments of method and apparatus for organizing, displaying and accessing contacts in a contact list, as described herein, may be executed on one or more computer systems, which may interact with various other devices. One such computer system is computer system 400 illustrated by FIG. 4, which may in various embodiments implement any of the elements or functionality illustrated in FIGS. 1-5. In various embodiments, computer system 400 may be configured to implement methods described above. The computer system 400 may be used to implement any other system, device, element, functionality or method of the above-described embodiments. In the illustrated embodiments, computer system 400 may be configured to implement the method 300 as processor-executable executable program instructions 422 (e.g., program instructions executable by processor(s) 410) in various embodiments.

In the illustrated embodiment, computer system 400 includes one or more processors 410a-410n coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the operations and methods described above, such as the method illustrated by the flowchart of FIG. 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for integrating telecommunication session output with one or more applications comprising:
communicating with one or more second devices in a telecommunication session using a first application disposed on a first device;
tracking attributes associated with the telecommunication session;
recording at least a portion of the telecommunication session on the first device to produce a session recording; and
storing at least one of a portion of the session recording or an association of at least a portion of the session recording in at least one of a second application on the first device and an application of the one or more second devices based on at least one respective, tracked attribute associated with the telecommunication session.

2. The method of claim 1, further comprising transmitting a request to record the telecommunication session to each of the one or more second devices.

3. The method of claim 1, wherein the attributes associated with the telecommunication session include at least one of participant identifiers of the second devices, a date and a time associated with the telecommunication session, a session duration, or a call quality, and wherein the attributes are stored in a calendar app on the first device at the date and time associated with the telecommunication session.

4. The method of claim 3, further comprising linking the tracked attributes to contact information of participants associated with the one or more second devices.

5. The method of claim 1, wherein recording at least a portion of the telecommunication session comprises:
starting a recording when an indication that permission to record is received; and
stopping the recording when an indication that the telecommunication session is ended is received.

6. The method of claim 1, wherein recording at least a portion of the telecommunication session comprises:
receiving a first indication to start recording the telecommunication session; and
receiving a second indication to stop recording the telecommunication session.

7. The method of claim 1, wherein storing the recording comprises:
receiving an input specifying an application in association with which to store the recording;
converting the recording to text; and
storing the text in in association with the specified application.

8. The method of claim 1, further comprising transmitting the recording to at least one of the one or more second devices.

9. The method of claim 1, further comprising:
receiving an input indicating a task to store in one or more applications on at least one of the one or more second devices;
generating a message comprising the task and the one or more applications in which to place the task; and
transmitting the message to at least one of the one or more second devices.

10. A computer-implemented method for integrating telecommunication session output with one or more applications comprising:

communicating with one or more second devices in a telecommunication session using a first application disposed on a first device;

tracking attributes associated with the telecommunication session;

recording at least a portion of the telecommunication session on the first device to produce a session recording;

receiving an input indicating a task associated with the telecommunication session to send to at least one of the one or more second devices;

generating a message comprising the task and at least some of the tracked attributes; and transmitting the message to the at least one of the one or more second devices, wherein the message transmitted to the at least one of the one or more second devices includes at least one of a portion of the session recording or an association of at least a portion of the session recording to be stored in association with an application on the at least one of the one or more second devices based on at least one respective, tracked attribute associated with the telecommunication session.

11. The method of claim 10, wherein the attributes associated with the telecommunication session include at least one of participant identifiers of the second devices, a date and time of the telecommunication session, a session duration, or a call quality.

12. A system for integrating telecommunication session output with one or more applications, comprising:
a mobile app configured to:
communicate with one or more second devices in a telecommunication session using a first application disposed on a first device;
track attributes associated with the telecommunication session;
record at least a portion of the telecommunication session on the first device to produce a session recording; and
store at least one of a portion of the session recording, or an association of at least a portion of the session recording in at least one of a second application on the first device and an application of the one or more second devices based on at least one respective, tracked attribute associated with the telecommunication session.

13. The system of claim 12, wherein the mobile app is a mobile Voice over Internet Protocol (VOIP) telecommunication app.

14. The system of claim 12, wherein the attributes associated with the telecommunication session include at least one of participant identifiers of the second devices, a date and time of the telecommunication session, a session duration, or a call quality.

15. The system of claim 14, wherein the attributes are stored in a calendar app on the first device at the date and time of the telecommunication session, and wherein the mobile app is further configured to link the tracked attributes to contact information of participants associated with the one or more second devices.

16. The system of claim 12, wherein recording at least a portion of the telecommunication session comprises at least one of (i) starting a recording when an indication that permission to record is received and stopping the recording when an indication that the telecommunication session is ended is received or (ii) receiving a first indication to start recording the telecommunication session; and receiving a second indication to stop recording the telecommunication session.

17. The system of claim 12, wherein storing the session recording comprises:
receiving an input specifying one or more applications on the first device in association with which to store the recording;
converting the recording to text; and
storing the text in the specified one or more applications on the first device.

18. The system of claim 12, wherein the mobile app is further configured to transmit the recording to the at least one of the one or more second devices.

19. A non-transitory computer readable medium for integrating telecommunication session output with one or more applications, comprising:
communicating with one or more second devices in a telecommunication session using a first application disposed on a first device;
tracking attributes associated with the telecommunication session;
recording at least a portion of the telecommunication session on the first device to produce a session recording; and
storing at least one of a portion of the session recording or an association of at least a portion of the session recording in at least one of a second application on the first device and an application of the one or more second devices based on at least one respective, tracked attribute associated with the telecommunication session.

20. The method of claim 1, wherein the session recording comprises a text transcription of the session recording.

21. The method of claim 10, wherein the session recording comprises a text transcription of the session recording.

22. The system of claim 12, wherein the session recording comprises a text transcription of the session recording.

23. The non-transitory computer readable medium, wherein the session recording comprises a text transcription of the session recording.

* * * * *